Figure 1:
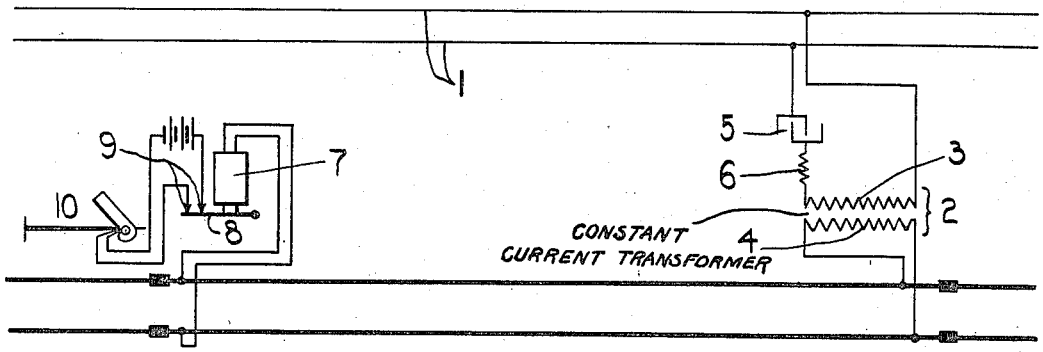

June 26, 1923.

A. E. TATTERSALL 1,459,999

RAILWAY SIGNALING APPARATUS

Filed Feb. 24, 1921

Inventor
Arthur E. Tattersall
by Hubert W. Jenner
Attorney.

Patented June 26, 1923.

1,459,999

UNITED STATES PATENT OFFICE.

ARTHUR EWART TATTERSALL, OF HARROW, ENGLAND.

RAILWAY SIGNALING APPARATUS.

Application filed February 24, 1921. Serial No. 447,576.

(GRANTED UNDER THE PROVISIONS OF THE ACT OF MARCH 3, 1921, 41 STAT. L., 1313.)

*To all whom it may concern:*

Be it known that I, ARTHUR EWART TATTERSALL, a subject of the King of Great Britain and Ireland, residing at Harrow, England, whose post-office address is "Radley," Welldon Crescent, Harrow, in the county of Middlesex, England, have invented certain new and useful Improvements in or Relating to Railway Signaling Apparatus; and I do hereby declare the following to be a full, clear, and exact description of the invention, such as will enable others skilled in the art to which it appertains to make and use the same.

This invention relates to railway signaling systems and apparatus, and in particular to track circuit signaling systems and apparatus of the kind in which an alternating electric current is fed to each track section and is adapted to operate or control a track relay belonging to that section in such a manner that the relay is energized or not according to the absence from or presence on the section of track of a train, or pair of wheels and axle, the relay in turn controlling other signaling apparatus.

The present invention has for its principal object to provide a system or apparatus in which the shunting effect is considerably improved, compared with present systems, and rendered comparable to that obtained in direct current track circuit signaling apparatus.

The maximum safe shunt impedance of a track circuit may be defined as the maximum impedance which connected from rail to rail will divert sufficient current from the relay to cause it to be de-energized. Whatever this maximum may be, it follows that for the safe operation of the track circuit, when the track section is occupied by a train or vehicle, the impedance offered to the alternating track current from rail to rail through the wheels and axles must not exceed this amount. With present alternating current track circuit systems, the maximum safe shunt impedance is considerably less than the maximum safe shunt resistance of direct current track circuits (chiefly due to the lower impedance of alternating current relays compared with direct current relays and the fact that alternating current relays require more power for their energization than direct current relays) and there is consequently a corresponding increase in the current supplied to the track when occupied, such increase being of course objectionable as it tends to keep the maximum shunt impedance at a low value.

The present invention consists principally in providing, in a system of the kind above mentioned, means whereby the maximum shunt impedance of the track circuit is materially increased so that the system will work efficiently under varying conditions met with in practice. Further according to this invention the maximum safe shunt impedance is increased by the employment of efficient means for maintaining a constant value of the current being delivered to the track circuit whether or not the track circuit is occupied by a vehicle or a pair of wheels and axle. Also according to this invention the maximum safe shunt impedance is still further increased by the employment of means for increasing the impedance of the relay circuit and thereby the total impedance of the track circuit. The shunting effect is so improved, by the present invention, as to insure that, under various working conditions met with in practice, the track relay shall be de-energized by the entrance of a train or a pair of wheels and axle on the rails of the track circuit. Further the apparatus according to this invention is simple, and is less liable to get out of proper working order than is the case with previously proposed systems.

In systems heretofore proposed and employed the track circuit is fed with alternating current from the secondary of a potential or pressure transformer the primary of which receives its current from a power line or other suitable source of alternating current, and the supply of current to the track-circuit is regulated by means of a resistance or impedance inserted in series with the secondary of the transformer and the rail circuit, a suitable alternating current track relay being connected to the rails of the circuit in the usual or any suitable manner.

According to the present invention, the track circuit is fed with alternating current from the secondary of a constant current transformer arranged in circuit with the rails of the insulated track section, the primary of this transformer receiving its current from a power line or other suitable source of alternating constant current. This current transformer may be of any approved type which utilizes the feature of "phase displacement" to insure the delivery of a constant current to the track whether the track be occupied by a train or not. In one type the magnetic leakage path between the primary and secondary windings is considerable, any tendency for an increase of current due to a decrease in the impedance of the secondary circuit i. e. the transformer secondary, in the track circuit being counterbalanced by a drop of pressure from self-induction. The current output or supply to the track circuit will therefore remain constant. In another well known type, the secondaries consist of two floating coils counterbalanced against the electro-magnetic repulsion of the primary coils and also balanced against each other. The primaries are fixed at the top and bottom of the vertical double legged core and work at a constant potential. Any change in the relative positions of the coils alters the re-actance of the combination and the balancing of the movable secondaries is so arranged that any change in the current value will immediately cause the coils to assume a new position and restore the current to its former value by the change in re-actance thus produced.

The constant current transformer renders the provision of the ordinary regulating resistance or impedance between the transformer secondary and the rails unnecessary, thus effecting economy in power consumption in the track-circuit represented by the track rails and track relay, this being a further advantage of the present invention.

Further according to this invention a suitable condenser or a suitable impedance is provided in the connection of the primary of the aforesaid current transformer to the source of supply of alternating current, either alone or in combination, the condenser alone being the preferred arrangement. The condenser or the impedance (or both if employed in combination) may be provided with adjustable steps so that the capacity and re-actance, or capacity, re-actance and impedance may be varied in order that the current being delivered to the track circuit may be varied to suit the insulation value of the track circuit. It is also found that this arrangement assists in maintaining a good regulation of the transformer, but its primary purpose is to afford an economical method of varying the current supplied to the track circuit according to the impedance of the track circuit.

By the means thus far described a predetermined current value in the track circuit can be kept practically constant, whereby the shunt effect is considerably improved.

Further according to this invention, for further improving the shunting effect by increasing the impedance of the relay circuit as hereinbefore mentioned a relay of higher impedance than those at present used may be employed, or a suitable resistance or impedance may be inserted in series with the relay, and in yet a further embodiment of the invention, more especially for use where a two element relay is employed, capacity in the shape of a condenser is inserted in series with the relay local winding and the source of alternating current supply thereto, and if desired also a suitable resistance or impedance is inserted for instance between the condenser and source of supply.

In the accompanying drawings which illustrate the invention, Fig. 1 is a diagrammatic view illustrating an insulated section of railway with alternating current track circuit supplied with current from a suitable source 1 of alternating current, and shows the hereinbefore mentioned constant current transformer 2 with its primary coil 3 connected to the leads of the supply 1 and with its secondary coil 4 connected to the rails of the insulated track section. This figure also shows the hereinbefore mentioned condenser 5 and the hereinbefore mentioned suitable resistance or impedance 6 connected in series with the supply 1 and the primary 3 of the transformer. 7 is the usual or any suitable track relay connected as usual to the rails of the track circuit section, 8 being the usual tongue or armature of this relay controlling, through the contacts 9, the local circuit of the signal 10 as usual.

Figure 2:
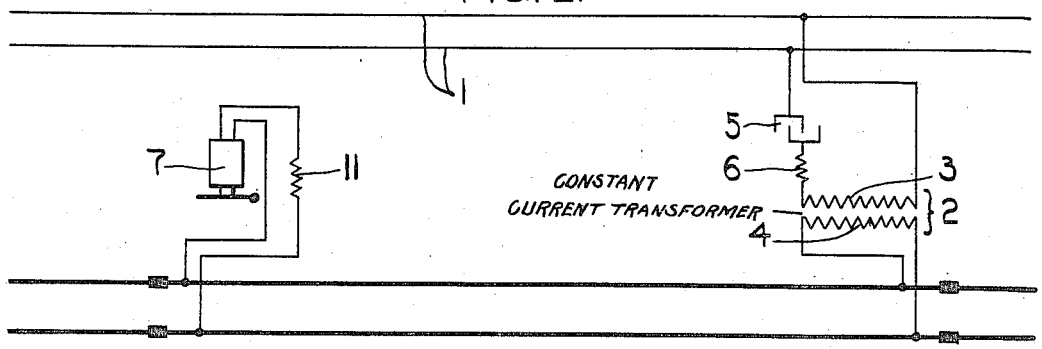

In the diagrammatic view Fig. 2, 11 is the hereinbefore mentioned resistance or impedance inserted in series, with the rails of the track circuit and the relay 7.

Figure 3:
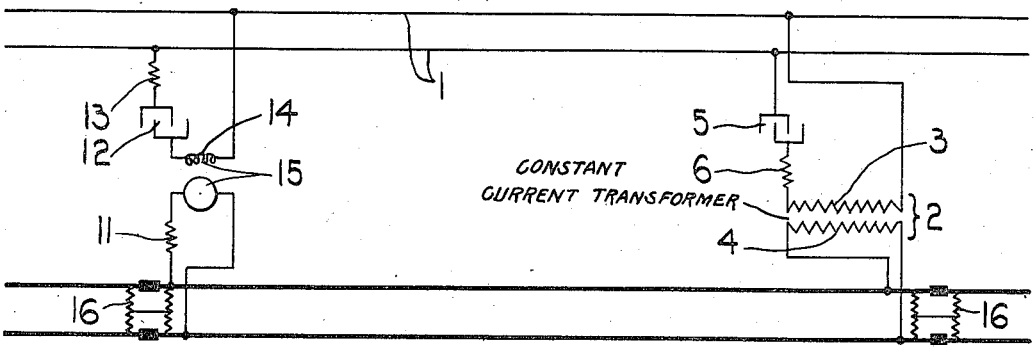

The diagrammatic view Fig. 3, shows the hereinbefore mentioned condenser 12, and impedance 13, connected in series with the source of alternating current supply 1 and the local coil 14 of a double element relay 15 of known or suitable type. This figure illustrates the system adapted for use on electrically operated railways employing an earthed traction return, 16 indicating the usual re-actance bonds employed in such a case. On electrically operated railways employing an insulated traction return, or in locations where the relay requires to be protected against extraneous currents, a relay isolating transformer is employed.

Referring to Fig. 2 which illustrates the hereinbefore mentioned method of improving the shunt effect by increasing the impendance of the relay circuit, it may be mentioned that this method has been attempted with existing systems but owing to the employment of a regulating resistance or impedance in series with the secondary of a potential or pressure transformer, the value of the extra impendance in the relay circuit had of necessity to be very small in order to keep the circuit as economical as possible, (as it is evident that the secondary pressure of the track transformer has to be increased to suit), so that the improvement in the shunting effect is not as great as in the present invention. In the present invention, however, owing to the employment of a current transformer in combination with either the condenser 5 or impedance 6, or both, and to the ordinary regulating resistance or impedance not being employed, the value of the inserted resistance (11 Fig 2) in the relay circuit can be made such that, for the same track power consumption as in existing systems, the shunting effect is greatly improved.

Where two-element track relays are employed, it is necessary to employ some agency whereby the currents in the two relay windings are either brought in phase, or 90° out of phase, according to the type of relay employed. With existing systems, this is usually accomplished by arranging the power factor of the regulating resistance or impedance to suit, or by providing what is known as a shielding winding at the relay. In many cases, especially with the polyphase induction relay, neither of these methods is entirely satisfactory, with the result that the track current has to be increased in order to provide the necessary torque at the relay, and this decreases the shunting effect. In the present invention the necessary phase relationship is provided, by the means above described with reference to Fig. 3, in a certain and economical manner as compared with previous systems.

By thus providing the phase relationship between the local and the track circuit windings (respectively 14, 15) of the relay, less current is required in the track circuit to satisfactorily operate the relay and the shunting effect is consequently improved. Further the action of the relay itself is improved owing to absence of chattering at the relay contacts.

What I claim as my invention and desire to secure by Letters Patent is:—

1. The combination, with a track section having insulated rails, of a constant current transformer having primary and secondary coils, leads connecting the primary coil with a source of alternating current, leads connecting the secondary coil with the said rails, the said transformer having a large magnetic leakage and operating to maintain a constant current in the secondary circuit whether the rails are occupied by a train or not, and a local circuit operatively connected with the said rails and having a signal and a relay included in it.

2. The combination, with the device set forth in claim 1, of means included in series in the primary circuit which operate to regulate the current in the primary circuit so as to vary the current in the secondary circuit to suit the insulation value of the rails.

In testimony whereof I affix my signature. in presence of two witnesses.

ARTHUR EWART TATTERSALL.

Witnesses:
W. HEZ SIMMS,
W. F. LINSON.